(12) United States Patent
Augst

(10) Patent No.: US 10,808,634 B2
(45) Date of Patent: Oct. 20, 2020

(54) METHOD, DEVICE AND MOBILE USER TERMINAL FOR ADAPTING AN ENERGY UTILIZATION PROCESS OF A MOTOR VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 265 days.

(21) Appl. No.: 15/465,152

(22) Filed: Mar. 21, 2017

(65) Prior Publication Data

US 2017/0276077 A1  Sep. 28, 2017

(30) Foreign Application Priority Data

Mar. 22, 2016 (DE) ........................ 10 2016 204 761

(51) Int. Cl.
*F02D 41/00* (2006.01)
*H04W 88/02* (2009.01)
(Continued)

(52) U.S. Cl.
CPC ....... *F02D 41/0025* (2013.01); *F02D 41/021* (2013.01); *F02D 41/2451* (2013.01);
(Continued)

(58) Field of Classification Search
CPC ........... B60K 2015/03197; B60K 2015/03361; B60L 15/2045; B60L 2240/622;
(Continued)

(56) References Cited

U.S. PATENT DOCUMENTS

| 5,915,368 A * | 6/1999 | Ishida .................. F02D 41/047 |
| | | 123/675 |
| 9,441,999 B2 | 9/2016 | Saavedra |

(Continued)

FOREIGN PATENT DOCUMENTS

| DE | 10 2004 051 287 A1 | 4/2006 |
| DE | 10 2013 202 193 A1 | 8/2014 |
| DE | 10 2014 216 133 A1 | 2/2015 |

OTHER PUBLICATIONS

German Search Report issued in German counterpart application No. 10 2016 204 761.2 dated Jan. 16, 2017, with Statement of Relevancy (Ten (10) pages).

*Primary Examiner* — Peter D Nolan
*Assistant Examiner* — Ce Li Li
(74) *Attorney, Agent, or Firm* — Crowell & Moring LLP

(57) ABSTRACT

Values of at least one energy utilization characteristic, which represents a first energy utilization process in a first vehicle, are determined. Furthermore, values of at least one parameter, which represents at least one boundary condition of the energy utilization in the first vehicle during the first energy utilization process, are also determined. A mathematical relationship between at least one or more values provided for the at least one energy utilization characteristic and the corresponding values of the parameters is determined and a profile record comprising a record and/or learning data is provided on the basis of at least one mathematical relationship determined. Depending on the profile record, at least one operating parameter of the drive system of the first vehicle and/or of a second vehicle is adapted in a second energy utilization process.

23 Claims, 3 Drawing Sheets

(51) Int. Cl.
*F02D 41/02* (2006.01)
*F02D 41/24* (2006.01)
*F02D 41/14* (2006.01)
*F02D 19/08* (2006.01)

(52) U.S. Cl.
CPC ....... *B60Y 2300/47* (2013.01); *B60Y 2300/52* (2013.01); *F02D 19/081* (2013.01); *F02D 41/1406* (2013.01); *F02D 41/2438* (2013.01); *F02D 2200/701* (2013.01); *H04W 88/02* (2013.01)

(58) Field of Classification Search
CPC .... B60L 2250/18; B60L 3/12; B60Y 2300/47; B60Y 2300/52; F02D 19/081; F02D 2200/0612; F02D 2200/70; F02D 2200/701; F02D 41/0025; F02D 41/0027; F02D 41/021; F02D 41/1406; F02D 41/1445; F02D 41/1498; F02D 41/2438; F02D 41/2451; G07C 5/008; G07C 5/08; G07C 5/0808; G07C 5/0841; Y02T 10/645; Y02T 10/72; Y02T 10/7283; Y02T 10/7291; Y02T 90/16; Y02T 90/162

See application file for complete search history.

(56) References Cited

U.S. PATENT DOCUMENTS

| | | | |
|---|---|---|---|
| 2009/0299608 A1* | 12/2009 | Loeffler | F02D 35/023 701/104 |
| 2011/0173991 A1* | 7/2011 | Dean | F01D 1/32 60/801 |
| 2013/0143631 A1* | 6/2013 | Platzer | A63H 18/005 463/6 |
| 2015/0051825 A1* | 2/2015 | Saavedra | G01F 9/023 701/123 |
| 2015/0371460 A1* | 12/2015 | Wenzel | G07C 5/008 701/1 |
| 2016/0001671 A1* | 1/2016 | Mori | B60L 11/1816 701/22 |
| 2017/0268948 A1* | 9/2017 | List | G01L 5/13 |
| 2017/0306868 A1* | 10/2017 | Tang | F02D 19/0623 |

* cited by examiner

METHOD, DEVICE AND MOBILE USER TERMINAL FOR ADAPTING AN ENERGY UTILIZATION PROCESS OF A MOTOR VEHICLE

CROSS REFERENCE TO RELATED APPLICATIONS

This application claims priority under 35 U.S.C. § 119 from German Patent Application No. 10 2016 204 761.2, filed Mar. 22, 2016, the entire disclosures of which are herein expressly incorporated by reference.

BACKGROUND AND SUMMARY OF THE INVENTION

The invention relates to a method, a device and a mobile user terminal for adapting an energy utilization process of a motor vehicle.

Modern drive systems of motor vehicles having combustion engines can adapt automatically to parameters of a fuel. In this context, the combustion engines of these modern vehicles utilize, in particular, different types of a traditional liquid fuel (Super 95, 98, E10, Ethanol in the form as, for example, widely used currently in South America, etc.) or natural gas. A number of fuel types within one class can be mixed more or less well with one another.

The various fuels vary in quality. Considerable differences in quality may occur even within one standard. Both the standards of the fuel types and their actual quality may change significantly during the lifecycle of a motor vehicle.

One aspect of the invention is to create a method, a corresponding device and a mobile user terminal for adapting an energy utilization process of a vehicle which provide for an improved energy utilization of the vehicle.

According to a first and second aspect, the invention is characterized by a method and a corresponding device for adapting an energy utilization process of at least one vehicle. Values of at least one energy utilization characteristic which represents a first energy utilization process in a first vehicle are determined. Furthermore, values of at least one parameter which represents at least one boundary condition of the energy utilization in the first vehicle during the first energy utilization process are determined. A mathematical relationship between at least one or more of the determined values of the at least one energy utilization characteristic and the corresponding values of the parameters is determined. A profile record comprising a record and/or learning data is provided on the basis of the at least one mathematical relationship determined. Depending on the profile record provided, at least one operating parameter of the drive system of the first vehicle and/or of a second vehicle is adapted in a second energy utilization process.

Advantageously, an increase in efficiency in the energy utilization can thus be achieved and a contribution to the protection of the environment provided, in particular by a reduction in $CO_2$ and/or harmful substances.

The first and second energy utilization process in each case relate particularly to an energy conversion process with respect to drive energy used substantially for propulsion. The first and second energy utilization process in each case relate especially to an energy conversion within the drive system of the first or the second vehicle, respectively, particularly within an internal combustion engine and/or within the drive train and/or chassis of the first or second vehicle, respectively.

The first vehicle or second vehicle, respectively, can have in each case one or more internal combustion engines. Additionally, the first and/or second vehicle can have in each case an electrical drive and thus be constructed as a hybrid vehicle. With respect to energy utilization by an internal combustion engine, the analogous term fuel utilization can also be used as an alternative or in addition to the term energy utilization.

In particular, the first energy utilization process and/or the second energy utilization process is a particular energy utilization process, for example an energy utilization process characterized by a particular driving context. A particular energy utilization process can then be a vehicle operation in a particular time interval and/or in the case of boundary conditions within particular cut-off values or boundary values, respectively, and/or in the case of a particular trip and/or in a particular operating mode of the vehicle.

In particular, the first and/or second energy utilization process relates, for example, to at least one particular operating mode of the drive system. In this context, the first and/or second energy utilization process can be, for example, a recuperation with a predetermined parameter or also only a warming-up phase of the drive system or an energy utilization process when driving downhill in which the drive system is used at least partially for an efficient speed reduction.

Alternatively or additionally, the first and/or second energy utilization process is an intermediate storage of energy as an electrical, hydraulic energy in one or more intermediate energy stores of the vehicle.

The first energy utilization process and the second energy utilization process can be identical or similar energy utilization processes, respectively, or essentially, qualitatively or quantitatively different energy utilization processes. For example, the first energy utilization process and the second energy utilization process can be processes of the same type, particularly processes of the same type which are running within similar or corresponding parts of the drive system or the energy utilization chains of the first or second vehicle, respectively. Alternatively, the first energy utilization process and the second energy utilization process can be processes of a different type, especially processes which run in different parts of the drive systems or the energy utilization chains of the first or second vehicle, respectively. In particular, the first energy utilization process and the second energy utilization process can be processes which relate to different time intervals, for example different trips, different days or months or are at least offset in time.

The values of the at least one energy utilization characteristic and the values of the at least one parameter are advantageously determined for a multiplicity of operating phases of the first vehicle, wherein the determining also comprises detecting with, for example, a sensor device.

The at least one energy utilization characteristic can be representative of at least one exhaust-gas characteristic and/or one actually achieved torque characteristic and/or at least one acquisition quantity of a knock sensor of the internal combustion engine of the vehicle and/or one or more ignition angles and/or ignition times.

Preferably, a number of parameters are determined which in each case represent a situation or boundary condition, respectively, of the energy utilization with respect to the first vehicle and/or the internal combustion engine and/or the environment of the first vehicle during the first energy utilization process. The parameters thus characterize boundary conditions which are present during the respective energy utilization. The parameter can comprise an operating variable of the internal combustion engine and/or of the vehicle, for example a speed of rotation and/or a torque and/or a tire temperature and so forth. Alternatively or additionally, the parameter can comprise an environmental state variable, for example an air humidity, an outside temperature and/or an air pressure and so forth. The at least one parameter can represent a permanent or variable boundary condition of the fuel utilization with respect to the first vehicle and/or the internal combustion engine and/or the environment of the first vehicle.

A slowly variable boundary condition can be considered here as a permanent boundary condition, for example an age of the vehicle or of its components (for example of an engine oil and/or a consumption component) or a not very variable driving profile or regular routes and so forth. Rapidly variable situations can be considered as variable boundary conditions, for example an outside temperature, an air pressure, an air humidity or driving profiles or routes characterized by particular features.

Advantageously, environmental conditions (temperature, air pressure, humidty and so forth) in which various cars and various fuels and drive systems have to operate and which can vary within wide ranges can thus be taken into consideration in the adaptation of the energy utilization, especially of the fuel utilization.

The values of the at least one energy utilization characteristic are stored and/or provided, for example, allocated to the respectively associated values of the at least one parameter of the energy utilization. Thus, the mathematical relationship between the at least one or the more values provided for the at least one energy supply characteristic and the corresponding values of the parameters can be determined and provided as record and/or learning data.

The mathematical relationship can comprise a predefined mathematical procedure, rule, regulation and/or relation between one or more energy utilization characteristics and one or more of the corresponding parameters. The mathematical relationship can then represent coefficients to one or more, particularly predetermined equations, polynomials or a simulation. In this context, this is, in particular, an appropriately designed mathematical relationship.

In a simplified case, the mathematical relationship can comprise a correlation between one or more energy utilization characteristics and one or more of the corresponding parameters related, in particular, to the same time intervals.

The mathematical relationship can be designed in such a manner that a result of the mathematical relationship represents a dependence between two or more parameters of the at least one boundary condition of the energy utilization and represents two or more corresponding energy utilization characteristics. Particularly preferably, the mathematical relationship represents a space for solution for a multiplicity of the characteristics of the first vehicle with respect to one or more (particular) energy utilization processes. In particular, one or more characteristics of the first vehicle can be described at least partially in a system-theoretical manner (relationship between the resulting input and output variables) with the mathematical relationship.

The record provided can then comprise all characteristics, or all those selected in accordance with particular criteria of the mathematical relationship. In particular, a selective record can comprise a selection, optimized in dependence on a case of application, of the characteristics of the mathematical relationship.

The learning data can then represent directly or indirectly a change of the record, particularly by an item of update information with respect to a previously stored or provided record.

Preferably, at least a part of the values of the record can be determined in dependence on a first energy utilization process, for example within a time interval, whereupon the learning data relating to a change of the record can be provided in the first vehicle.

The profile record provided can then comprise at least one record and/or learning data on the basis of one or more mathematical relationships determined. In this context, a profile record can comprise, for example, the data of the record and/or learning data and a usage regulation for the data.

Said in simplified terms, a profile record provided can represent a particular "wealth of experience" (corresponding to record) or a new "experience" or "update of the experience" (corresponding to learning data) of the first vehicle with regard to the energy utilization of the first motor vehicle under different boundary conditions.

Vehicles have specific characteristics which change with time and appear magnified mostly with increasing age of the vehicle. By means of the profile record determined, the energy utilization of the vehicle, taking into consideration these special characteristics, can be adapted in such a manner that one or more aspects of the energy utilization of the first vehicle and/or of the second vehicle are improved and/or optimized.

For example, the profile record can be completed and/or updated continuously, event-controlled or at regular time intervals. In particular, the profile record can be updated depending on new learning data in each case. For example, a profile record already stored in the second vehicle can be updated in dependence on a conveyed learning record which has been determined in dependence on the data of a first vehicle. This offers particularly high efficiency, fast and effective updating of the method. In this context, only one profile record with the learning data based on the data of a first vehicle which comprise a change or updating of a previous profile record for a second vehicle can be conveyed, wherein thereupon the change of only a relevant part of the previous profile record are updated changed.

As a result, it is possible to obtain, from initial data which represent a combination of the multiplicity of various permanent boundary conditions and variable boundary conditions, resultant records which can then be applied to a multiplicity of combinations, particularly new combinations of permanent and variable boundary conditions particularly applicable in a maximally precise manner.

The values of the at least one energy utilization characteristic can be provided allocated to the respectively associated values at a predetermined first data interface. The profile record determined can be provided at a predetermined second data interface. The first data interface and the second data interface can be designed as one or two interfaces. A control device of the vehicle can have the first data interface and a mobile user terminal can have the second data interface. In particular, the profile record can be determined by a mobile user terminal. Alternatively or additionally, the mobile user terminal can be designed to determine, in dependence on vehicle sensor data provided, the value of the at least one energy utilization characteristic and/or to acquire and/or to determine the values of the at least one parameter.

The profile record can thus be determined also in dependence on data of at least one vehicle sensor and/or in dependence on user settings which, in particular, can be predetermined by means of the mobile user terminal. In this context, the user can change his settings by a human-machine interface of the first vehicle and/or by means of a mobile user terminal.

An exchange of the profile records which have been determined for various first motor vehicles can take place by means of a mobile user terminal (smartphone, tablet, plug-in navigation device etc.). In this context, these can also be read in a purpose dependent manner (with an appropriate app) and utilized by other users.

The profile record can be received or else selectively retrieved by a further mobile user terminal of a user of the second vehicle. By means of the further mobile user terminal of the user of the second vehicle, one or more vehicle settings of the second vehicle can thus be changed via a predefined interface of the second vehicle.

For the case that previously no or not sufficient values of the at least one parameter have previously been detected and/or determined, for example in the case of a new vehicle, the values of the at least one parameter can also be obtained from a simulation or from values of another vehicle, particularly at the starting point of the method. In a simplified case, these can be input and/or imported and later corrected by genuine measurement values.

In an advantageous embodiment according to the first and second aspect, the profile record represents at least a change of the energy utilization characteristic in dependence on an adaptation of one or more operating parameters of the drive system of the first vehicle and/or an adaptation of the at least one operating parameter of the drive system for the second vehicle.

Preferably, the learning data of the profile record then comprise one or more quantitative measures which represent at least a change of the energy utilization variable in dependence on one or more measures of an operating parameter of the drive system of the first vehicle and/or of the second vehicle.

In a further advantageous embodiment according to the first and second aspect, the profile record represents one or more adaptation variants of the at least one operating parameter of the drive system of the first vehicle and/or for the second vehicle which leads to an optimization of the energy utilization characteristic, particularly with respect to a particular second energy utilization process or to a second energy utilization process of a particular type.

In particular, the learning data of the profile record represent one or more potential changes of the energy utilization variable at one or more changes of the at least one operating parameter of the drive system of the first vehicle and/or of the second vehicle.

Furthermore, an optimized adaptation of the operating parameters can also be carried out in dependence on further predefined criteria, following the provision of a profile record for adaptation of one or more operating parameters of the drive system of the first vehicle and/or of the second vehicle.

The profile record can represent one, particularly multi-dimensional, space for solutions within which the operating parameters of the drive system of the first vehicle and/or of the second vehicle can also be adapted in dependence on further constant or variable criteria relating to the second energy utilization process.

In a further advantageous embodiment according to the first and second aspect, in dependence on the profile record provided, a utilization of at least two different fuel types and/or fuel brands is varied in the first vehicle and/or in the second vehicle.

In this context, in particular, time intervals for the utilization of at least two different fuel types and/or fuel brands and/or certain mixtures of fuel types and/or fuel brands can be varied. Particularly preferably, a composition of the fuel utilized in the first vehicle and/or the second vehicle can be varied, particularly in small stages in dependence on the profile record provided.

In another advantageous embodiment according to the first and second aspect, the composition of a fuel conducted currently or in the near future to an internal combustion engine of the first or the second vehicle, respectively, is varied in dependence on the profile record provided, according to the first and second aspect.

In particular, the utilization of at least two different fuel types and/or fuel brands in the first vehicle and/or in the second vehicle can be varied by means of a particularly time-variable addition of at least one additional component to the fuel (for example lubricant, particular nanoparticles etc.). The particularly time-variable addition of one or more additional components can take place, for example, in the vehicle tank, in a fuel line or a mixing chamber or directly inside an internal combustion engine.

In a further advantageous embodiment according to the first and second aspect, in the case of a change of the at least one operating parameter of the drive system for adaptation of the energy utilization, the changing of the at least one operating parameter of the drive system is permitted only within a predetermined range of values and/or within a predetermined scientific relationship between two or more operating parameters.

On this basis, particularly if this part of the method, for example, is implemented in an energy control device according to ISO standards and ASIL, the method can be industrialized (also with some further measures). Thus, an interface can also be created with which an also uncritical influencing of an operating parameter of the drive system is possible with a software application (colloquially also called app) in accordance with strictly predefined criteria. A particular special advantage is obtained in the implementation of a part of the method as an app because by this means security systems are "decoupled" from the relatively insecure data. Additionally, a mathematical method can be provided which, for example, represents a time-related restriction, for example restricts an order of the change of at least second operating parameters and/or a rate of change of certain parameters. Thus, the complete system can be designed for a high degree of security, reliability and error tolerance required for applications of this type.

In a further advantageous embodiment according to the first and second aspect, values of at least a second parameter which represents a current or predicted boundary condition of the energy utilization of the first vehicle or of the second vehicle are determined and/or provided. Depending on the values of the at least one second parameter, the at least one operating parameter of the drive system of the first vehicle or of the second vehicle, respectively, is adapted.

This has the advantage that on the basis of the profile record of the first vehicle the energy utilization for the first vehicle and/or the second vehicle can be adapted in dependence on the boundary conditions expected in each case for the corresponding vehicle. In particular, the first or second vehicle, respectively, can be tanked with at least two mixable types of fuels (for example E10 and Super in the recommended proportion). As well, special additives to be mixed into the tank can be reliably determined, taking into consideration the expected boundary condition, and added to the tank content automatically or by the vehicle user.

In a further advantageous embodiment according to the first and second aspect, the at least one energy utilization characteristic is representative of a measure of a wear and/or of a consumption and/or residual running power of a vehicle component.

Depending on the profile record provided, information or a statement, respectively, about a change of a state and/or of a degree of wear of the respective vehicle component and/or a residual running power of at least one component can thus be determined by the respective energy utilization. The vehicle component can comprise a vehicle engine and/or a drive component and/or a catalyzer and/or a consumption component, particularly a filter and/or a vehicle fluid, especially engine oil or a cooling fluid.

In a further advantageous embodiment according to the first and second aspect, a state and/or a degree of wear and/or a residual running power or a change of the state and/or of a degree of wear and/or of the residual running power of one or more predetermined vehicle components, for example of a vehicle component of a particular type is determined, particularly over a relatively long period in dependence on one or more of the profile records.

In this context, the "state" can be a "permanent state", particularly a physical or chemical state, respectively. In particular, the vehicle components are such vehicle components which have a direct relationship to a (particular) energy utilization process. In particular, this can be components of the internal combustion engine, of the drive and/or of the actuators of the chassis.

The changing of a state and/or of a degree of wear can also comprise determining, particularly estimating the residual running power. The residual running power can also be related, for example, to a traveling distance (kilometers) and/or an absolute speed of rotation and/or units of time.

A change of a state and/or of a degree of wear and an estimate of the (residual) life can be determined at least partially with means of the mobile user terminal of the user (driver of the vehicle). In this context, profile records, particularly also other data relating to a multiplicity of the vehicles can be read in with means of the mobile user terminal. In this context, for example, very efficient and precise predictions about the residual life of certain vehicle components (a particular vehicle or vehicle type) can be determined. Thus, data relating to changes of a state and/or of a degree of wear and/or an estimate of the (residual) life can also be obtained for vehicles without a corresponding data acquisition, IT infrastructure etc.

Alternatively or additionally, the profile record can be determined in dependence on information which represents a change of a state and/or of a degree of wear of the respective vehicle component, wherein, here, too, this information can be related, in particular, to a preferably cumulative wear and/or consumption of vehicle components. Particularly preferably, a corresponding mathematical relationship represents the dependencies between at least one boundary condition of the energy utilization of an energy utilization process and the change of a state and/or of a degree of wear.

Alternatively or additionally, the profile record can also be determined in dependence on further information derived from the information. Here, numerous methods of statistical mathematics can be applied. Thus the standardized and/or corrected dependencies can be determined. Following this, an optimum for a fuel, fuel composition or mixture, which is optimum overall, can be determined and applied, for example also from statistical information from many vehicles which preferably have the same type and which are operated under different boundary conditions, especially also with respect to conditions to be expected in the future.

Depending on one or more profile records, information relating to an improvement of particular parameters of the vehicle components can also be advantageously derived. In particular, the quality of the vehicle components can be improved selectively and efficiently in the development or production in dependence on the data determined. As well, valuable data and/or information on the improvement of particular vehicle components concerning supply products or third-party products directly or indirectly can be obtained. For example, weak points of vehicle components can thus be recognized in a simple and/or unambiguous manner and evaluated to the advantage of the consumer or the vehicle manufacturer, respectively.

In a further advantageous embodiment according to the first and second aspect, the at least one parameter is representative of a state and/or a residual running power of one or more vehicle components of the first vehicle.

The energy utilization characteristic thus also provides for a statement about an influence of a state and/or of a residual running power of the respective vehicle component on the energy utilization. The vehicle component can comprise a vehicle engine and/or a drive component and/or a catalyzer and/or a consumption component, particularly a filter and/or a vehicle fluid, particularly engine oil or a cooling liquid. It is possible to determine at least rough values for the age, the degree of wear and/or residual life or nominal residual power of one or more vehicle components.

In a further advantageous embodiment according to the first and second aspect, the at least one energy utilization characteristic represents an energetic efficiency of the utilization of the particular fuel used in the first vehicle under the boundary conditions determined.

Advantageously, this makes it possible to provide the energetic efficiency of the respective fuel composition in the particular vehicle together with the situations or boundary conditions in the fuel utilization which were present in each case, for the profile record of the vehicle. This can be utilized particularly advantageously for the adaptation of a fuel utilization of the vehicle particularly in the case of very high or very low speeds of rotation since an operation and efficiency of an engine at very low and very high speeds of rotation is greatly fuel-dependent depending on the operating temperature. The energetic efficiency can also represent two, three or more characteristics which relate to different speeds of rotation or a speed statistic (as boundary condition). From an integral value, a (useful) energy can be determined with time at the boundary conditions present in each case. This energy value can be directly or indirectly a component of the profile record.

In a further advantageous embodiment according to the first and second aspect, for a multiplicity of first vehicles the profile record is determined and provided in each case. Depending on at least a part of the respective profile records a resultant profile record is determined and provided and, depending on the resultant profile record provided, the at least one operating parameter of the first vehicle and/or of the second vehicle is adapted. In particular, the resultant profile record forms the profile record provided by the first vehicle, depending on which of the at least one operating parameter is adapted.

The sending, receiving or exchanging and the aggregation of the respective profile records can be arranged preferably by means of at least one mobile user terminal. In this context, a selective exchange of optimization information between two or more users can take place. By this means, these data intended for exchange can also be made extremely compact and, if necessary, absolutely uncritical with respect to data protection. The exchange can take place, for example, via a cloud network, an Internet portal, Bluetooth™, etc.

In a further advantageous embodiment according to the first and second aspect, depending on an authentication and/or compatibility check of the profile record provided or of the resultant profile record, the at least one operating parameter of the first vehicle or of the second vehicle, respectively, is adapted.

In particular, the proportions of fuel types and/or of a fuel mixture in the tank of the second vehicle can be adapted and/or the operating parameters of the drive system of the second vehicle can be adapted in dependence on the authentication and/or the compatibility check of the profile record provided. The authentication can take place, for example, with a digital vehicle key which comprises the access authorization to the second vehicle.

In a further advantageous embodiment according to the first and second aspect, depending on the profile record provided for the first vehicle or of the resultant profile record, a set of setting changes is determined for the energy utilization of the first or of the second vehicle and, depending on a predetermined selection of the setting changes, the at least one operating parameter of the drive system of the first or of the second vehicle, respectively, is adapted.

The selection of the adaptation measures can be specified by a predetermined operating confirmation of an input device of the respective vehicle or of the mobile application terminal of a user of the respective vehicle. In this context, a transfer or a change of settings can be displayed, in particular, graphically on a display device of the respective vehicle and/or of the respective mobile user terminal. As well, the setting changes determined in advance for the respective vehicle and/or a predictable result of the setting changes can be represented. The adjustment changes can then also be selected individually or overall by the user.

In a further advantageous embodiment according to the first and second aspect, a graphical user information item is determined and output which represents one or more changes with respect to a second energy utilization process which has been performed in dependence on at least one profile provided or is proposed to the user.

In particular, certain changes to the second energy utilization process, which are related to the operating parameters of the drive system of the vehicle, are then represented. In this context, qualitative and/or quantitative measures of the change can be represented in the user information, for example in a graphical form.

In particular, a dependence between a value of at least one energy utilization characteristic which represents a first energy utilization process in the vehicle of the user, a value of at least one parameter which represents at least one boundary condition of the energy utilization in the vehicle of the user during the first energy utilization process, and the change of an operating parameter or of a corresponding mode of the drive system of the vehicle of the user, at least qualitatively, particularly also quantitatively, can be represented in the user information.

In this context, the vehicle of the user can be analogously the first vehicle or the second vehicle, respectively.

In this context, the user information can represent particular changes or new values of particular operating parameters of the drive system in a graphical form (for example bars, circle diagrams, color coding etc.). In this context, simplified graphical information, particularly also one which is simply or intuitively comprehensible also for laypersons, can be output.

In this context, at least one change of an operating parameter of the drive system of the vehicle of the user, which exceeds a predetermined measure, can be represented or displayed as a mode change of the drive system of the vehicle. At the same time, one or more reasons for the change or the mode change can be represented and/or recommendations of actions for the user for example with respect to the utilization of particular fuel brands, for example related to the expected boundary conditions.

It is thus possible to display to the user of the respective vehicle, particularly graphically, what will change in his motor vehicle and, if necessary, how and what will be affected by the adjustment changes. He can then decide overall or selectively about this, for example as a combination of two or more decisions, for example by selecting and/or displacing a selection slider.

The users of the first and/or second vehicle can thus change, particularly via a predetermined interface of their mobile user terminal, one or more vehicle settings of their vehicle, particularly to direct or indirect, with respect to operating parameters of the drive system of the first vehicle or of the second vehicle.

In a further advantageous embodiment according to the first and second aspect, a further profile record is determined for a further vehicle in dependence on the profile record of the first vehicle and/or the resultant profile record and a predetermined conversion record, wherein a vehicle type of the further vehicle differs from the vehicle type of the first vehicle.

Thus, the profile record can be converted from the first vehicle which, in particular, represents a first vehicle type, to a further vehicle and/or a further vehicle type by means of the conversion record. Preferably, the conversion record can comprise a scientific relationship, for example a mathematical function and/or a pivotal table etc. which is or, respectively, are obtained on a simulation basis and/or on a statistical basis. The conversion record represents data which are suitable for mapping the data of the profile record of the first vehicle or of the first vehicle type onto the data of the further profile record of the further vehicle or of the further vehicle type. Particularly preferably, initial data of the profile record and/or initial data of the conversion record can be based on a record determined or accepted by means of theoretical findings which is optimized by an aggregation with the respective, particularly current, statistical data iteratively and/or recursively. This has the advantage that profile records of vehicles with deviating vehicle types can also be utilized for mutual improvement of the data of the profile records. This can lead to a faster improvement of the data of the respective profile records.

In a further advantageous embodiment according to the first and second aspect, the profile record determined is interpolated and/or extrapolated for values of the at least one predetermined parameter which represents a current or a future boundary condition of the energy utilization of the first vehicle. Depending on the interpolated and/or extrapolated profile record, the at least one operating parameter of the drive system of the first or, respectively, second vehicle is adapted. In particular, the proportions of the fuel types and/or the fuel parameter values are determined for the current or future fuel utilization.

This is advantageous because precisely corresponding boundary conditions and configurations of the drive system are only rarely repeated. In particular, the learning data of the profile record can be interpolated and/or extrapolated. Preferably, the proportions of the fuel types or the fuel parameter values, respectively, of the fuel mixture are determined in dependence on one or more optimization criteria. The determining of the proportions and/or of the fuel parameter values can take place preferably by an interpolation from the basic data of two or more earlier boundary conditions which have an in each case higher and a lower value in comparison to a boundary condition determined in advance. This provides for a very high degree of improvement or optimization, respectively, even in the case of little input data.

In a further advantageous embodiment according to the first and second aspects, if, during the energy utilization, a fuel is utilized one or more values of at least one fuel parameter of a fuel type or fuel brand currently used for the operation of the internal combustion engine is determined and/or provided. The values of the at least one energy utilization characteristic are then also stored and/or provided allocated to the respectively associated values of the at least one fuel parameter. Furthermore, the profile record for the first vehicle is also determined in dependence on the values, belonging to the provided values of the at least one energy utilization characteristic, of the at least one fuel parameter.

This has the advantage that the energy utilization characteristic can be evaluated also with respect to the fuel utilized in each case. The value or values of the at least one fuel parameter can be determined in each case after a tanking process. The at least one fuel parameter can be representative of proportions of different fuel types and/or a mixing ratio of predetermined fuel components in the fuel, utilized currently in each case, of the vehicle.

The value of the at least one fuel parameter can comprise a fuel brand and/or a fuel type and/or octane number and/or a viscosity and/or a proportion of a fuel component and so forth. By means of the profile record, a change of the at least one fuel parameter can thus be determined, for example, which is required for an approximation of the energy utilization characteristic determined, particularly a fuel utilization characteristic, to a predetermined nominal fuel utilization characteristic. The nominal fuel utilization characteristic can be an optimized value for the fuel utilization characteristic.

In a further advantageous embodiment according to the first and second aspect, values for a predetermined set of parameters of the energy utilization and/or fuel parameters are determined and, based on an iterative optimization, a global optimum of the at least one energy utilization characteristic is determined for at least two optimization criteria in dependence on at least a part of the parameters and/or of the fuel parameters of the predetermined set.

In this context, a scalar optimum of the at least one fuel utilization characteristic can be determined initially in each case for an individual optimization criterion and by means of one or more scalar optima determined temporarily, an adaptation of the parameters can take place in two or more steps until a global optimum is reached or approximated. In this context, the scalar optima determined temporarily can be related to different optimization criteria, for example energy efficiency or safeguarding of the vehicle etc.

This has the advantage that very many parameters of the energy utilization, which characterize the boundary conditions of the energy utilization, and complex mathematical relationships, can be evaluated efficiently.

Data relating to the optimization can also be conveyed to other facilities and/or mobile application terminals and/or vehicles and/or exchanged between the facilities and/or the mobile application terminals and/or vehicles.

In a further advantageous embodiment according to the first and second aspect, the at least one parameter of the energy utilization comprises a parameter of at least one utilization byproduct and/or an item of information which is representative of dealing with the at least one utilization byproduct.

The at least one parameter of the energy utilization can thus comprise parameters of a catalyzer setting and/or an item of information which is representative of a degree of soiling of a filter and/or an amount of further waste products. This makes it possible that possibly harmful fuel utilization products can be made less harmful with means of the vehicle at the prevailing boundary conditions (or boundary conditions which have been determined in advance for the near future).

In a further advantageous embodiment according to the first and second aspect, the at least one energy utilization characteristic is determined in dependence on a predetermined statistical function which represents one or more statistical relationships between at least two of the fuel parameters and/or at least two of the parameters of the energy utilization and/or between at least one of the fuel parameters and at least one of the parameters of the energy utilization which are determined during a number of energy utilization phases.

Advantageously, an influence and mutual influences of the respective fuel parameters and the other parameters in the energy utilization can thus be quantified and evaluated. This can be utilized for a further development of fuel types, supplier products or third-party products, respectively, and for a better utilization of the vehicle potentials.

In a further advantageous embodiment according to the first and second aspect, the energy utilization characteristic is determined in dependence on one or more variables which is representative of at least one exhaust-gas characteristic and/or one torque characteristic actually achieved and/or at least one detection variable of a knock sensor of the internal combustion engine of the vehicle and/or one or more ignition angles and/or ignition times.

By means of the method, an internal-combustion-engine-related and/or an electric-motor-related drive system of the first or of the second vehicle, respectively, can be adapted and thus in each case an optimum operating mode and drive mode can be achieved. Especially in the case of vehicles which can be driven by two or more energy sources, for example types of Otto fuel, natural gas and electric charge, a vehicle driver is in most cases overtaxed or unnecessarily burdened when finding an in each case advantageous, let alone optimum operating mode and drive type. The operating parameter of the drive system can comprise one or more configuration data, characteristics, regeneration parameters etc. of the drive system.

It is a further advantage that the energy utilization, particularly the fuel utilization or wear, respectively, and/or consumption of vehicle components of vehicles during a lifecycle of the vehicles can be adapted to changed fuel standards and/or new fuel types.

It is particularly advantageous that no hardware adaptation of the vehicle is required which provides for rapid market introduction and vehicles already in series can also utilize the method for adaption of the energy utilization without hardware retrofitting. The advantages of the method can thus also be rolled out to vehicles which are in series production (without hardware retrofitting).

The vehicle is preferably a motor vehicle or motorcycle. This results in a number of advantages described explicitly as part of this document and a number of further advantages obvious to the expert. A particularly large advantage is also obtained in the application to a fleet of vehicles (multiplicity of first vehicles and/or multiplicity of second vehicles), for example belonging to one or more, for example cooperating brands or members of an organization or a group, respectively, of a social network, with a multiplicity of boundary conditions.

According to a third aspect, the invention is characterized by a mobile application terminal which is configured to determine, especially to read in, values of at least one energy utilization characteristic allocated to respectively associated values of at least one parameter, wherein the energy utilization characteristic represents an energy utilization process in a first vehicle and the at least one parameter represents a boundary condition of the energy utilization during the energy utilization process of the first vehicle. Furthermore, the mobile user terminal is designed to determine a mathematical relationship between the at least one or more of the determined values of the at least one energy utilization characteristic and the corresponding values of the parameters and to provide them as record and/or learning data. Furthermore, the mobile user terminal is designed to provide a profile record which comprises the record and/or the learning data. Furthermore, the mobile user terminal is designed to provide the profile record at a second data interface and/or to determine and provide at the second data interface information, particularly control signals which are utilized or usable for adaptation of at least one operating parameter of the drive system of the first or of a second vehicle, respectively, depending on the profile record for the first vehicle and/or the second vehicle.

The mobile user terminal is thus designed to carry out at least a part of the steps of the method for adapting an energy utilization process of a vehicle according to the first aspect. Advantageous embodiments of the first aspect also apply to the third aspect in this context. In particular, the mobile user terminal can be designed to determine the respective profile record and/or the accumulated profile data and to provide them at the second data interface for the first and/or the further vehicle. For this purpose, the mobile application terminal can have a wire-connected or wireless interface. The mobile user terminal can comprise a smartphone, a tablet PC, an item of clothing with a suitable electronic device, a smart watch and/or a portable navigation device and so forth. Advantageously, a transmitting part and/or a sensor system and/or computing resources and/or a transceiver unit and/or authentication methods of the mobile user terminal can thus be used alone or together.

According to a further aspect, the invention is characterized by a computer program, the computer program being designed to perform the method according to the first aspect or an advantageous embodiment of the method according to one or more further features of the method. In particular, the computer program is a software program which can be run, for example, as an app (application) for one or more types of mobile user terminals. This can be preferably also a trademark-specific software program, particularly also configured for handling customer, user or accounting data.

According to a further aspect, the invention is characterized by a computer program product which comprises executable program code wherein the program code on execution by a data processing device executes the method according to the first aspect or an advantageous embodiment of the method according to the first aspect. The computer program product comprises, in particular, a medium readable by the data processing device, on which medium the program code is stored.

According to a further aspect, the invention is characterized by a program product which comprises an authorized access right to stored data of the computer program product.

Exemplary embodiments of the invention are explained in the text which follows with reference to the diagrammatic drawings in which:

Other objects, advantages and novel features of the present invention will become apparent from the following detailed description of one or more preferred embodiments when considered in conjunction with the accompanying drawings.

DETAILED DESCRIPTION OF THE DRAWINGS

Elements of identical construction or function are figure-independently provided with the same reference symbols.

Figure 1:
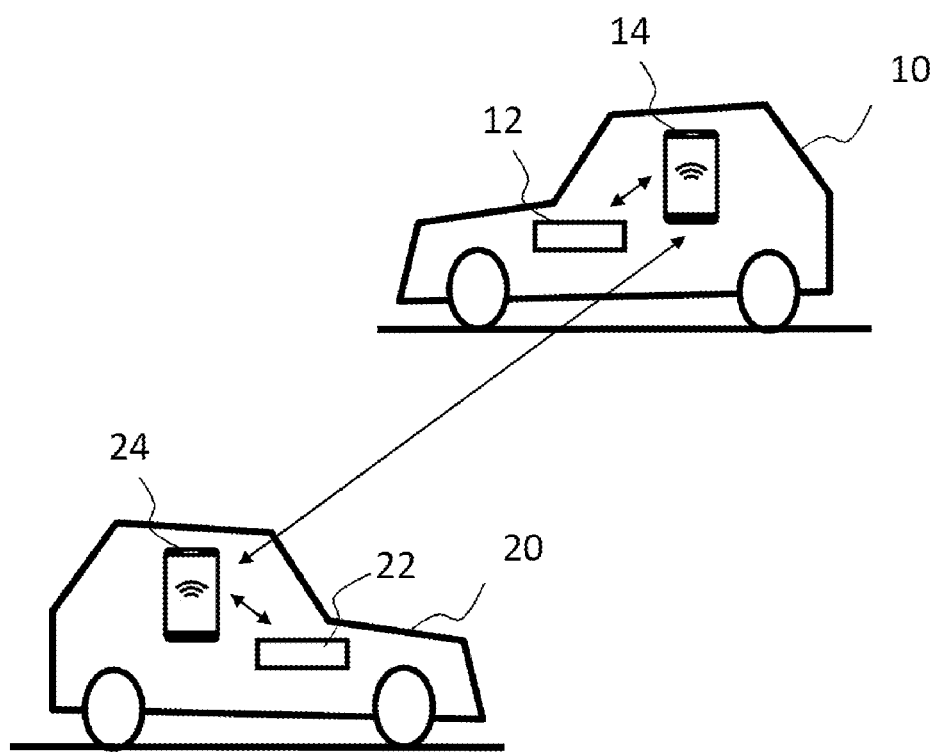
FIG. 1 shows an exemplary embodiment of a system for controlling an energy utilization process of at least one vehicle.

FIG. 1 shows an exemplary embodiment for a system for controlling an energy utilization process of at least one vehicle. The system comprises at least one first vehicle 10 and optionally at least one second vehicle 20. The first vehicle 10 or the second vehicle 20, respectively, have, for example, at least one internal combustion engine. Alternatively or additionally, the first or the second vehicle 10, 20, respectively, can have an electric drive. The first vehicle 10 has a first control device 12 and the second vehicle 20 has a second control device 22. Optionally, the system has mobile user terminals which are usable by a respective user of the first vehicle 10 or the second vehicle 20, respectively, for adapting the energy utilization of the respective first vehicle 10 or of the respective second vehicle 20, respectively. The respective mobile user terminal 14, 24 can comprise, for example, a smartphone and/or tablet PC and/or a plug-in navigation device.

The first control device 12 is designed to acquire and/or to determine values of at least one energy utilization characteristic K which represents a first energy utilization process in the first vehicle 10.

Furthermore, the first control device 12 is designed, for example, to acquire and/or to determine values of at least one parameter P which represents at least one boundary condition of the energy utilization in the first vehicle 10 during the first energy utilization process.

The first control device 12 is designed, for example, to store the values of the at least one energy utilization characteristic K allocated to the respectively associated values of the at least one parameter P and to provide a first data interface.

Furthermore, the first control device 12 is designed to adapt, in response to a reception of a profile record Rec provided at a second data interface in dependence on the profile record Rec provided, at least one operating parameter of a drive system of the first vehicle 10 and/or of the at least one second vehicle 20 during a second energy utilization process, particularly also the at least one operating parameter in dependence on at least one second parameter, which represents a current or projected boundary condition of the energy utilization.

The values of the at least one second parameter P2_1, P2_2 are determined, for example in dependence on at least one predetermined route attribute of a route section traveled or to be traveled and/or in dependence on the traveling times of the first and second vehicle 10, 20, respectively. In particular, an operating mode of the first vehicle 10 or of the second vehicle 20, respectively, can thus be adapted in dependence on the at least one predetermined route attribute of the route section traveled or to be traveled and/or in dependence on the traveling times. For example, it can be taken into consideration during adaptation of the energy utilization whether it is a day or night drive. Furthermore, actual target values for noise pollution, $CO_2$ emission, fine dust expulsion et cetera on particular route sections can be taken into consideration. Thus, information about the environmental zones of particular route sections can also be taken into consideration. For example, an environmental zone can be determined with means of the first vehicle 10 or of the second vehicle 20, respectively, and following this, the proportion of a particular type of energy can be determined which fits the respective route sections. In particular, the route sections with particular environmental zones 1, 2, 3, 4 can then be determined from a navigation map and/or from the backend and/or by means of a traffic signal recognition, for example also with a camera. Following this, the optimized proportions of the energy types can be determined and/or the vehicle 10, 20 can then switch these over correspondingly when traveling along the route.

Alternatively or additionally, the values of the at least one second parameter P2_1, P2_2 can be determined in dependence on a traveling statistic of the first vehicle 10 or of the second vehicle 20, respectively, and/or
a vehicle setting with respect to a drive mode of the first vehicle 10 or of the second vehicle 20, respectively, and/or
at least one precalculated traveling route for the first vehicle 10 or for the second vehicle 20, respectively, and/or
a projected outside temperature and/or
current exhaust-gas data of the first vehicle 10 or of the second vehicle 20, respectively, and/or
data of a knock sensor of the internal combustion engine of the first vehicle 10 or of the second vehicle 20, respectively, and/or
calendar data of a user of the first vehicle 10 or of the second vehicle 20, respectively, and/or
driver settings of the first vehicle 10 or of the second vehicle 20, respectively, and/or
a use of the first vehicle 10 or of the second vehicle 20, respectively, for a specific purpose.

The driving statistic can comprise, for example, a road length statistic and/or speed statistic and/or a height-profile statistic (heavy/flat) and/or traffic density statistic (urban/rural). The vehicle settings, for example comfort, sport, normal, can be determined by means of currently and/or previously used settings of a driving experience switch. The at least one pre-calculated route can comprise a most probable route of the first vehicle 10 of the second vehicle 20, respectively, which was determined. The current exhaust-gas data can be determined, for example by means of a regulated catalyzer of the first or second vehicle 10, 20, respectively. The driver settings can also include direct user settings and current user wishes. The use for the special purpose can be, for example, a rescue use.

For determining the values of the at least one second parameter P2_1, P2_2, for example, the mobile application device 14, 24 can be designed to call up the corresponding data from the first vehicle 10 or the second vehicle 20, respectively, for example from a predetermined software application (also called app) from separately administered records or from the Internet via a wireless interface and to account for these in accordance with predetermined special or specific scientific relationships. In this context, optimum values for the energy delivery can be displayed, read out and/or directly or indirectly conveyed to the energy point, for example for an energy supply process. Preferably, calendar data or plannings of one or more subsequent users and/or data of the following user or users can be taken into consideration in the way as described above, in the case of rental vehicles.

A first mobile user terminal 14 which is used by a respective user of the first vehicle 10 for adapting the energy utilization of the first vehicle 10 is designed, for example, to receive the values, provided at the first interface, of the at least one energy utilization characteristic K and to determine a mathematical relationship between the at least one or more of the values determined of the at least one energy utilization characteristic and the associated values of the parameters. Furthermore, the first mobile user terminal 14 is designed, for example, to provide a profile record comprising a record and/or learning data on the basis of the at least one mathematical relationship determined at a specified second interface.

The second control device 22 of the second vehicle 20 is designed, for example, to receive the profile record Rec, which is provided at a second data interface, from the mobile application terminal and to adapt at least one operating parameter of the drive system of the second vehicle 20. In particular, the operating parameter can be adapted in dependence on second parameters which represent a current or predicted boundary condition of the energy utilization of the second vehicle 20.

Alternatively or additionally, the respective first mobile user terminal 14 or the respective second user terminal 24 of a user of the second vehicle 20 can be designed to provide, in dependence on the profile record Rec and the values of the at least one second parameter P2_1, P2_2 control signals for the first control device 12 and second control device 22, respectively, and to provide them at the second data interface.

The first control device 12 of the first vehicle 10 and/or the second control device 22 of the second vehicle 20 can be designed to receive control signals which are suitable for controlling the adaptation of the at least one operating parameter of the drive system of the first vehicle 10 or of the second vehicle 20, respectively, and which, for example, are provided at the second data interface of the first mobile user terminal 14 or the second user terminal 24, respectively, and, depending on the received control signals, to adapt the at least one operating parameter of the drive system of the first vehicle 10 or of the second vehicle 20, respectively.

In this respect, control information which causes a change of the at least one operating parameter of the drive system outside the predetermined range of values or of the relationships between two or more operating parameters, can be rejected and/or restricted to predetermined boundary values and/or the specified relationship.

The distribution of the functions, described above, of the first control device 12, second control device 22, the first mobile user terminal 14 and the second mobile user terminal 24 is exemplary and can also be different. Further variants are, for example, that the profile record Rec is determined with means of the first vehicle 10, particularly also in dependence on the data of the first mobile user terminal 14 and the profile record Rec or information, dependent thereon, is conveyed to a stationary storage or computing unit, for example a Cloud, a backend, Internet portal or directly to the second mobile user terminal 24 of the second user or directly or indirectly to a computer unit of the second vehicle 20.

Figure 2:
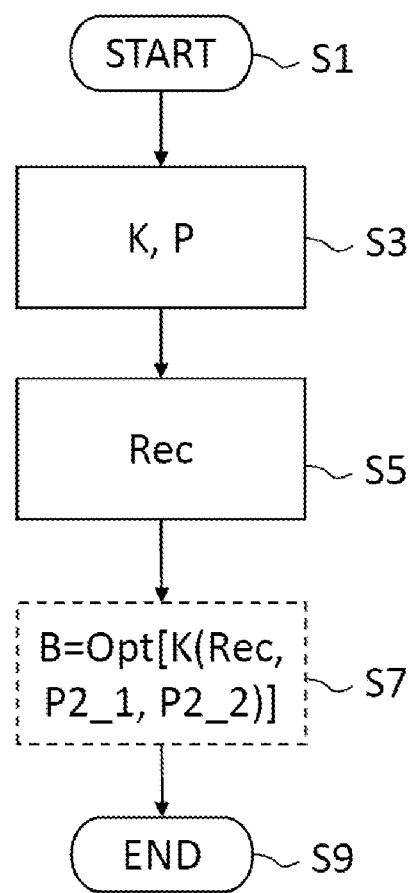
FIG. 2 shows an exemplary flow chart of a program for adaptation of an energy utilization process of a vehicle for a mobile user terminal.

FIG. 2 shows an exemplary flow chart of a program for the adaptation of an energy utilization process of a vehicle for the first mobile application device.

The program is started in a step S1.

In a step S3, values of at least one, preferably a number of predetermined energy utilization characteristics K, which represent an energy utilization in a first vehicle 10, are read in. Allocated to the values of the energy utilization characteristics, respectively associated values of at least one, preferably a number of predetermined parameters P are read in and/or stored which represents a boundary condition or situation of the first energy utilization process. The boundary condition or situation, respectively, relates, for example, to the first vehicle 10 and/or the internal combustion engine and/or an electric drive and/or the environment of the first vehicle 10.

The respective energy utilization characteristics K are provided, for example, by the first control unit of the first vehicle 10.

The at least one energy utilization characteristic K is, for example, representative of at least one exhaust-gas characteristic and/or a torque characteristic actually achieved and/or for at least one detected value of a knock sensor of the internal combustion engine of the first vehicle 10 and/or for one or more ignition angles and/or ignition times.

The exhaust-gas characteristic can comprise data from a regulated catalyzer of the first vehicle 10 and/or the data of the regulated catalyzer in combination with further data of the first vehicle 10 or of the first mobile user terminal 14. In particular, the at least one exhaust-gas characteristic is suitable to describe characteristics of the exhaust gas of the first vehicle 10. The torque characteristic actually achieved can be dependent on a fuel supply, particularly with respect to different operating types of the drive system of the first vehicle 10. Preferably, the torque characteristic is stored allocated to these parameters P.

These energy utilization characteristics K can be detected preferably with means within the first vehicle 10 and/or from data detected by means of the first vehicle 10 (for example with a computing unit of the first vehicle 10) or determined with the first mobile user terminal 14, for example via an interface, similar to an on-board diagnostic interface. The energy utilization characteristics K determined can be both scientifically exposed sequences or timing functions et cetera and represent relationships expressed scientifically, for example as formula or formula coefficients, between two or more characteristics with respect to one another or one or more characteristics and dependent on one or more parameters which in each case represent a situation of the energy utilization or boundary condition of the energy utilization, respectively. In the case of the data from a knock sensor, ignition angle or ignition times, statistical data and/or dependency data and/or correlation data can also be collected, read out and localized. For example, the so-called OBD (On-Board Diagnostic) interface is also available for this purpose.

The values of the parameters P can be provided, for example, by the first vehicle 10 by means of the navigation device and/or the first control device 12 and/or the on-board computer of the first vehicle 10. Alternatively or additionally, the values of the parameters P can be provided, for example, by second, vehicle-external facilities, for example a backend of the vehicle manufacturer. Alternatively or additionally, the values of the parameters P can be provided by the mobile application device itself (see FIG. 3).

In a step S5 (see FIG. 2), the record and/or the learning data is determined and the profile record, which comprises the record and/or the learning data, is provided. The record and the learning data, respectively, for the first vehicle 10 are determined in dependence on at least a part of the stored or provided values of the at least one energy utilization characteristic K and its associated values.

In particular, coefficients are determined for the profile record on the basis of a predetermined mathematical relationship which, for example, represents predetermined equations, polynomials or simulations.

The profile record can represent, for example, at least one change of the energy utilization characteristic K in dependence on an adaptation of the at least one operating parameter of the drive system of the first vehicle 10 and/or of an adaptation of the at least one operating parameter of the drive system for the second vehicle 20.

The profile data record Rec can represent, for example, one or more adaptation variants of the at least one operating parameter of the drive system of the first vehicle 10 and/or for the second vehicle 20, which leads to an optimization of the energy utilization characteristic K.

The profile record Rec can also represent only a difference, particularly an optimizing change, for example, for performing a particular optimization step. As a result, these data intended for exchange can be designed to be extremely compact and absolutely uncritical from a data protection point of view.

Thus, the data available in the first mobile user terminal 14 can also be used or data which the first mobile user terminal 14 can determine or wirelessly enquire from a further vehicle-external facility, for example backend, Cloud, customer portal, et cetera.

The data read in from the first vehicle 10 or determined in the first vehicle 10 which are read out with the first mobile user terminal 14, for example the smartphone of the user, for example via the on-board diagnostic interface or WLAN, et cetera can be utilized together with further data to determine the profile record Rec with an application software and, if necessary, to distribute it then. Together with the parameters P of the energy utilization which characterize the boundary conditions which can also be detected at least partially with the first mobile user terminal 14 and/or can be edited by the first mobile user terminal 14, the profile record Rec and particularly the learning data are determined.

Optionally, a resultant profile record Rec_res can be determined in step S5 in that, in dependence on a number of profile records which were determined and provided by the respective first vehicles 10, a resultant profile record Rec_res is determined.

Figure 3:
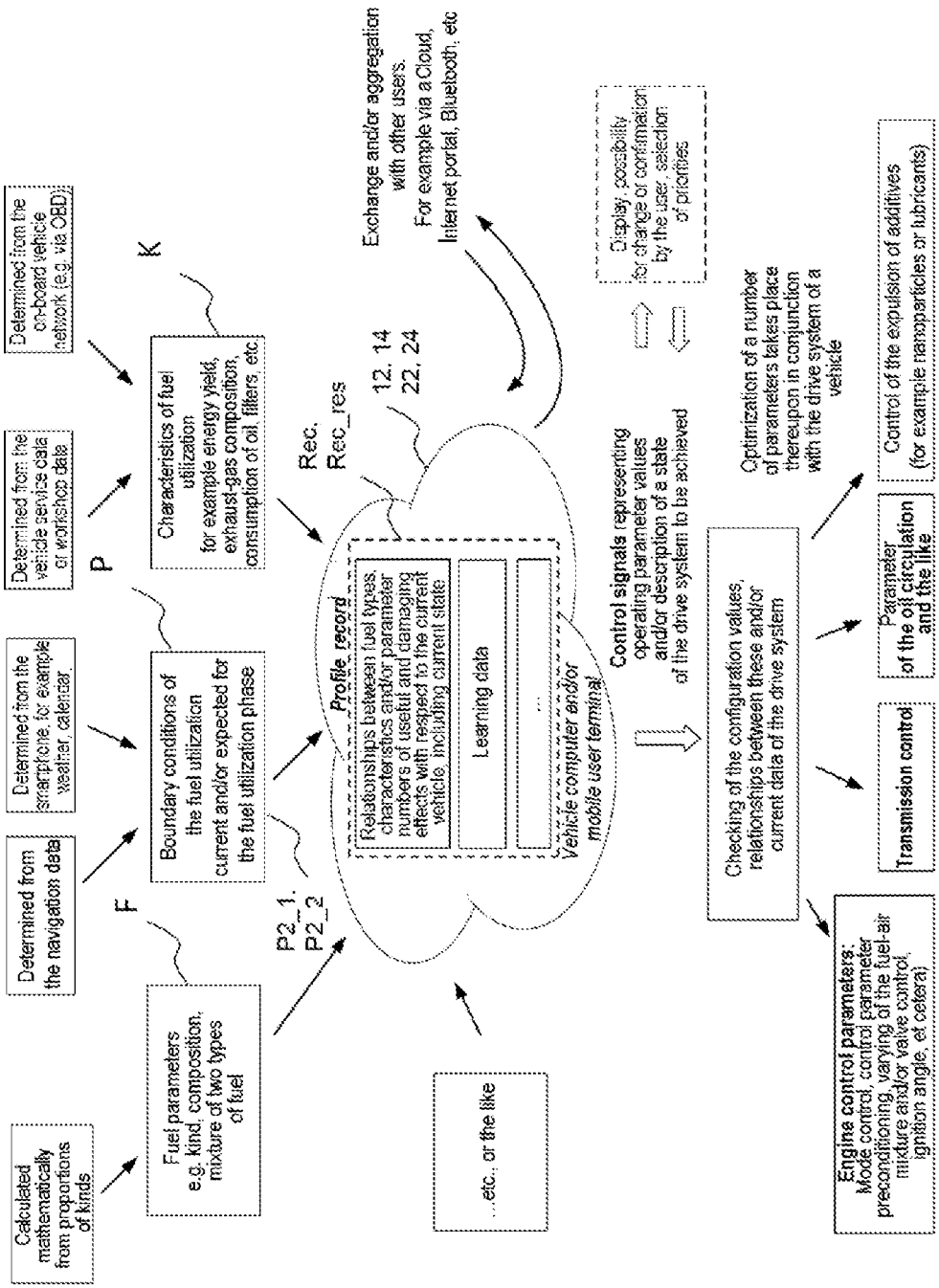
FIG. 3 shows an exemplary block diagram for the program for adapting an energy utilization process of a vehicle.

The profile record Rec can be fused and/or aggregated, for example, by means of a software application, with earlier profile records of this type and/or conveyed by means of a customer portal, Cloud, backend (see FIG. 3). Whereupon, the profile records of the first vehicle 10 can be used by other users or vehicles.

Preferably, in this case the first vehicles 10 have respectively an identical type or related type. The respective profile records can then have been determined with consideration of identical or different boundary conditions. This has the advantage that the profile records can be much more accurate and more comprehensive. As well, the learning data which have been determined over many energy utilization phases in the first vehicle 10 under different boundary conditions can be aggregated among one another, for example accounted for with a particular destination.

In a step S7 (see FIG. 2), for example, at least one optimum operating parameter B of the drive system of the first vehicle 10 is determined in dependence on the profile record Rec and/or the resultant profile record Rec_res. Alternatively or additionally, optimal components of fuel types and/or fuel brands in the tank of the first vehicle 10 and/or an optimum distribution of energy types can be determined for the internal combustion engine and/or the electric drive.

For example, it can be provided that a user specifies by means of a predetermined operating device of the first vehicle 10 and/or the first mobile user terminal 14 a selection and/or weighting of optimizing criteria for the fuel utilization (see FIG. 3).

For a simple specification of the optimization criteria, two or a number of options and relationships between the options can be displayed. Preferably, at least two options influencing one another mutually may be represented by means of a selection slider and/or spider diagram and/or of a two- or three-dimensional selection space for selecting the optimization criteria. In this context, the optimization criteria can be positive, representing a value for an achieved or achievable use, for example achieving maximum values, and/or negative, representing values for completed or possible avoidance or reduction (for example reduction of consumption, price, reduction of $CO_2$ emissions and reduction of costs, et cetera).

Alternatively or additionally, depending on the profile record Rec, a set of possible changes of settings for the adaptation of the at least one operating parameter of the drive system of the first vehicle 10 can be determined and, depending on a further predetermined selection of the setting changes, the at least one optimal operating parameter of the drive system of the first vehicle 10 can be determined.

Depending on the selected setting changes and/or optimization criteria, a setting of the drive can be determined and forwarded to the first control device 12 of the first vehicle 10.

For the optimization, current or predicted boundary conditions can also be taken into consideration in that the optimization also takes place in dependence on the at least one second parameter P2_1.

FIG. 3 shows an exemplary block diagram of the program for adaptation of an energy utilization process of the first, 10, or second vehicle 20, wherein, for example, fuel is utilized in the energy utilization process.

The profile record Rec may represent the boundary conditions of the energy utilization, particularly of the fuel utilization, for example in dependence on fuel parameters F, parameters P, the boundary conditions of the energy utilization, particularly of the fuel utilization, and of the energy utilization characteristics K, in this case fuel utilization characteristics. The parameters P of the fuel utilization can be determined, for example, from navigation data and/or from weather data and/or calendar data. The energy utilization characteristics K can be determined from the vehicle service data and/or workshop data and/or from the on-board vehicle network. The fuel parameters F can be calculated, for example, mathematically from proportions of kinds. The profile record Rec comprises, for example, relationships between fuel types, characteristics and/or parameter numbers of useful and damaging effects with respect to the current vehicle. Alternatively or additionally, the profile record comprises the learning data.

In dependence on the profile record Rec, control signals, for example, are determined which are representative of at least one operating parameter of the drive system and/or a state of the drive system to be achieved. Depending on control signals, configuration values, relationships between these and/or data of the drive system in the first vehicle 10 or the second vehicle 20, respectively, can be checked.

Optionally, an optimization of a number of parameters can take place thereupon in conjunction with the drive system of the first vehicle 10 and of the second vehicle 20, respectively.

For example, the engine control and/or the transmission control and/or the parameter of the oil circulation and/or the control of the expulsion of additives can be adapted.

Furthermore, a use determined, particularly a use determined in a cumulative form can be displayed to the user of the respective vehicle 10, 20. In particular, values can be output representing:
  increase in energy yield and/or
  improvement of the exhaust-gas values and/or
  cost saving and/or
  postponement of an examination date for the workshop
  other improvements achieved, et cetera.

Furthermore, abstract values of "vehicle satisfaction" can be determined and output.

LIST OF REFERENCE SYMBOLS

10 first vehicle
12 first control device of the first vehicle
14 first mobile user terminal
20 second vehicle
22 second control device of the second vehicle
24 second mobile user terminal
B optimized operating parameter
F fuel parameter
K energy utilization characteristic
P parameter
P2_1 second parameter referring to the first vehicle
P2_2 second parameter referring to the second vehicle
Rec profile record
Rec_res resultant profile record The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adapting an energy utilization process of at least one vehicle, wherein the energy utilization process converts energy for vehicle propulsion, the method comprising the acts of:
    determining values of at least one energy utilization characteristic of a first vehicle, wherein the at least one energy utilization characteristic is characteristic of a first energy utilization process that converts energy for propulsion of the first vehicle;

determining values of at least one parameter of the first energy utilization process, wherein the at least one parameter represents at least one boundary condition of energy utilization during the first energy utilization process;

determining mathematical relationships between the determined characteristic values and corresponding parameter values;

providing a profile record comprising at least one of: a record and learning data, based on the determined mathematical relationships; and adapting, based on the profile record, at least one operating parameter of respective drive systems of the first vehicle and the second vehicle in a second energy utilization process, wherein, if, during the energy utilization, a fuel is utilized, the method further comprises:
  determining one or more values of at least one fuel parameter of a fuel type or fuel brand currently used for the operation of the internal combustion engine;
  providing the values of the at least one energy utilization characteristic allocated to the respectively associated values of the at least one fuel parameter; and
  determining the profile record for the first vehicle, based on the provided values of the at least one energy utilization characteristic, of the at least one fuel parameter.

2. The method as claimed in claim 1, wherein the profile record represents at least one change of the energy utilization characteristic based on said adapting of the at least one operating parameter of the drive system of the at least one of the first vehicle and the second vehicle.

3. The method as claimed in claim 1, wherein the profile record represents one or more adaptation variants of the at least one operating parameter of the drive system of the at least one of the first vehicle and the second vehicle, whereby an optimization of the energy utilization characteristic is provided.

4. The method as claimed in claim 1, further comprising the act of:
  varying, based on the profile record provided, a utilization of at least two different fuel types and/or fuel brands in the at least one of the first vehicle and the second vehicle.

5. The method as claimed in claim 1, further comprising the act of:
  varying, based on the profile record, a composition of a fuel supplied currently or in the near future to an internal combustion engine of the at least one of the first vehicle and the second vehicle.

6. The method as claimed in claim 1, wherein adapting the at least one operating parameter of the drive system comprises adapting the at least one operating parameter of the drive system only within a predetermined range of values and/or within a predetermined scientific relationship between two or more operating parameters.

7. The method as claimed in claim 1, further comprising the acts of:
  determining values of at least a second parameter, which represents a current or predicted boundary condition of the energy utilization of the first vehicle or of the second vehicle; and
  adapting, based on the values of the at least one second parameter, the at least one operating parameter of the drive system of the first vehicle or of the second vehicle, respectively.

8. The method as claimed in claim 1, further comprising the act of:
  determining, based on one or more of the profile records, at least one of a state, a degree of wear, a residual running power, a change of the state, a change of the degree of wear, and a change of the residual running power of one or more vehicle components.

9. The method as claimed in claim 1, wherein the at least one energy utilization characteristic is representative of a measure of at least one of a wear, a consumption, and a reduction of the residual running power of a vehicle component.

10. The method as claimed in claim 1, wherein the at least one parameter is representative of at least one of a state and a residual running power of one or more vehicle components of the first vehicle.

11. The method as claimed in claim 1, wherein the at least one energy utilization characteristic represents an energetic efficiency of the utilization of a particular fuel with a fuel parameter in the first vehicle under the boundary conditions determined.

12. The method as claimed in claim 1, further comprising the acts of:
  determining and providing the profile record for each of a plurality of first vehicles;
  determining and providing a resultant profile record based on at least a part of the respective profile records;
  adapting, based on the resultant profile record, the at least one operating parameter of the drive system of the at least one of the first vehicle and the second vehicle.

13. The method as claimed in claim 12, further comprising the act of:
  adapting, based on an authentication and/or compatibility check of the profile record of the first vehicle or of the resultant profile record, the at least one operating parameter of the drive system of the first vehicle or of the second vehicle, respectively.

14. The method as claimed in claim 12, further comprising the acts of:
  determining, based on the profile record provided for the first vehicle or of the resultant profile record, a set of setting changes for the energy utilization of the first vehicle or of the second vehicle; and
  adapting, based on a predetermined selection of the setting changes, the at least one operating parameter of the drive system of the first or of the second vehicle, respectively.

15. The method as claimed in claim 12, wherein a further profile record is determined for a further vehicle based on the profile record of the first vehicle and/or the resultant profile record and a predetermined conversion record, wherein a vehicle type of the further vehicle differs from the vehicle type of the first vehicle.

16. The method as claimed in claim 1, further comprising the acts of:
  at least one of interpolating and extrapolating the profile record for values of at least one predetermined parameter which represents a current or a future boundary condition of the energy utilization of the first vehicle; and adapting, based on the interpolated and/or extrapolated profile record, the at least one operating parameter of the drive system of the at least one of the first vehicle and the second vehicle.

17. The method as claimed in claim 1, wherein values for a predetermined set of parameters of the energy utilization and/or of fuel parameters are determined and, based on an iterative optimization, a global optimum of the at least one energy utilization characteristic is determined for at least two optimization criteria in dependence on at least a part of the parameters of the energy utilization and/or the fuel parameters of the predetermined set.

18. The method as claimed in claim 1, wherein the at least one parameter of the energy utilization comprises a parameter of at least one utilization byproduct and/or an item of information which is representative of dealing with the at least one utilization byproduct.

19. The method as claimed in claim 1, further comprising the act of:
 determining the at least one energy utilization characteristic, based on a predetermined statistical function which represents one or more statistical relationships between at least two of the fuel parameters and/or at least two of the parameters of the energy utilization and/or between at least one of the fuel parameters and at least one of the parameters of the energy utilization which are determined during a number of fuel utilization phases.

20. The method as claimed in claim 1, further comprising the act of:
 determining the energy utilization characteristic, based on one or more variables which is representative of at least one of exhaust-gas characteristic, one torque characteristic actually achieved, at least one detection variable of a knock sensor of the internal combustion engine of the vehicle, one or more ignition angles, and ignition times.

21. The method as claimed in claim 1, further comprising the act of:
 determining and outputting a graphical user information item representing one or more changes with respect to a second energy utilization process which has been performed in dependence on at least one profile provided or is proposed to the user.

22. A device for adapting an energy utilization process of a vehicle, wherein the device is configured to carry out the method of claim 1.

23. A mobile application device configured to:
 determine values of at least one energy utilization characteristic of a first vehicle, the at least one energy utilization characteristic corresponding to respective values of at least one parameter, wherein the energy utilization characteristic is characteristic of a first energy utilization process that converts energy for propulsion of the first vehicle, and wherein the at least one parameter represents a boundary condition of energy utilization during the first energy utilization process,
 determine mathematical relationships between the determined characteristic values and corresponding parameter values,
 provide a profile record comprising at least one of: a record and learning data, based on the determined mathematical relationships, and
 provide information to the first and second vehicles, based on the profile record, wherein the utilization of the information causes the first and second vehicles to each adapt at least one operating parameter of a respective drive system,
 wherein, if, during the energy utilization, a fuel is utilized, the mobile application device is further configured to:
 determine one or more values of at least one fuel parameter of a fuel type or fuel brand currently used for the operation of the internal combustion engine;
 provide the values of the at least one energy utilization characteristic allocated to the respectively associated values of the at least one fuel parameter; and
 determine the profile record for the first vehicle, based on the provided values of the at least one energy utilization characteristic, of the at least one fuel parameter.

* * * * *